May 21, 1957   C. R. GALLAMOS   2,792,668
ADJUSTABLE BOOK REST AND HOLDER SUPPORT
Filed Jan. 12, 1954   2 Sheets-Sheet 1

CONSTANCIO R. GALLAMOS
INVENTOR

May 21, 1957  C. R. GALLAMOS  2,792,668
ADJUSTABLE BOOK REST AND HOLDER SUPPORT
Filed Jan. 12, 1954  2 Sheets-Sheet 2
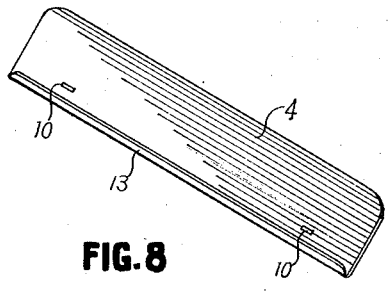
FIG. 8
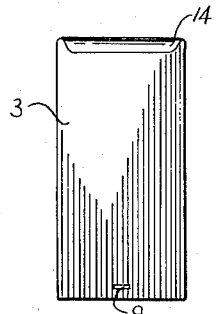
FIG. 9
FIG. 10
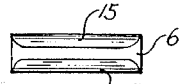
FIG. 11
FIG. 12
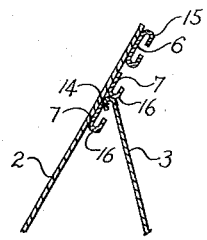
FIG. 13
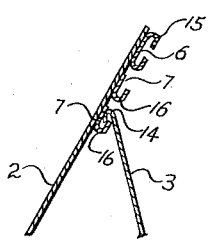
FIG. 14
FIG. 15
FIG. 16
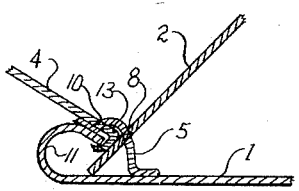
FIG. 17
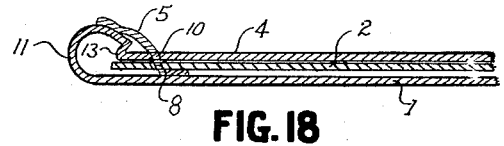
FIG. 18
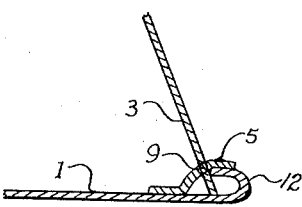
FIG. 19
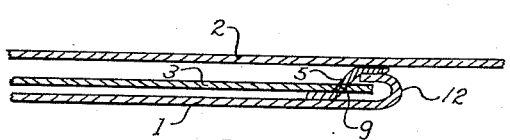
FIG. 20
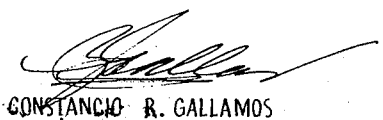
CONSTANCIO R. GALLAMOS
INVENTOR

United States Patent Office 2,792,668
Patented May 21, 1957

2,792,668

ADJUSTABLE BOOK REST AND HOLDER SUPPORT

Constancio R. Gallamos, Manila, Republic of the Philippines

Application January 12, 1954, Serial No. 403,601

2 Claims. (Cl. 45—80)

My invention relates to a new and useful kind of book prop which is an improvement in the high-priced, voluminous, heavy and unwieldy wooden book props now commonly used in churches and by some students and reviewees for government examinations.

Heretofore, the use of the book prop has been limited to the confines of religious edificies during religious ceremonies and to a few students or reviewees who either can afford to order for the same in a carpentry shop or, being unable to do so, find time to fashion crude book props from pieces of wood. Furthermore, as far as I am aware, only those used in churches are foldable, and these are high-priced for the following reasons: (1) a considerable amount of wood is required for each book prop which, incidentally, accounts for its heaviness; (2) the unavoidable use of at least four metal hinges for each book prop; and (3) the cost of labor is comparatively high. My device successfully eliminates all these disadvantages because (1) cheap and abundant materials such as discarded tin or aluminum cans or plain galvanized iron or plastics are the best materials for its manufacture; (2) three small tin or aluminum or plastic strips most efficiently take the place of metal hinges; and (3) it can be easily and cheaply manufactured by simple production methods especially where the material used is tin or aluminum or plain galvanized iron or strong cardboard. On top of this, my book prop can be folded in one motion like a notebook, and it is as light as, and thinner than an ordinary notebook when folded. For these reasons, my book prop can be conveniently tucked along by the student to school, to any public library, and then back home. Similarly, my book prop can be placed easily inside one's brief case or portfolio.

In the manufacture of my adjustable book rest and holder support, plastics or ordinary tin or aluminum or plain galvanized iron sheets or strong cardboard may be used. Furthermore, it can be easily manufactured by simple local production methods. For these reasons, my book prop can be sold at a price easily within the reach of every student, reviewee or teacher.

The primary object of my invention is to provide the general book and/or magazine reading public, and more especially the student population, with a very handy, low-priced book prop which can be conveniently carried along to school, to any public library, and then back home like a notebook.

Another object of my invention is to provide a device of the aforementioned character which utilizes abundant and cheap materials for its manufacture such as plastics or discarded tin cans or plain galvanized iron sheets, aluminum or strong cardboard, easy and inexpensive to manufacture and very effective in serving its purpose.

Still another object of my invention is to provide a device of the aforementioned character which will make the studies of students as well as reviewees for any board or bar or civil service examination and the work of teachers and professors much easier and convenient and more productive of good results.

Finally, another object of my invention is to provide the general book and/or magazine reading public with a device of the aforementioned character which will help much in the way of safeguarding the pulmonary health of said public in that when using a book prop the reader is induced to sit up straight or erect and never to stoop or bend over the book as one is won't to do when not using a book prop thus placing one's lungs in an oppressed position which may cause the inception or the aggravation of lung ailment.

In the course of my explanation and detailed description of my invention, other objects and advantages of the same will come to light.

In the accompanying drawings, like parts are designated by like numerals throughout, and said drawings are briefly described as follows:

Figure 8 is an isometric view of the book support with one of its lengthwise edges hooked and showing the rectangular slots or holes through which are passed the connecting strips (Fig. 15) so as to join the book support to the other parts of the device.

Figure 9 is the outer view of the prop showing the slot or hole at its lower end through which is passed one end of the connecting strip (Fig. 15) so as to join said prop to the base member.

Figure 10 is a vertical side view of the prop showing its hooked upper endmost.

Figure 11 is a perspective view of the uppermost slant-adjustment strip with its opposite longitudinal sides being already curved towards each other.

Figure 12 is a perspective view of one of the three identical lower slant-adjustment strips with its lower longitudinal side being already curved or hooked.

Figure 13 is a transverse sectional view showing the position of the slant-adjustment strips as described in Figures 11 and 12 after having been soldered or otherwise permanently attached to the under-side of the book rest, in relation to the hooked end of the prop while the device is in its open or operative position.

Figure 14 is a transverse sectional view showing the relative position of the hooked upper end of the prop with respect to the slant-adjustment strips as described in the next preceding paragraph, which relative position is assumed when the reader holds the book rest so as to lift or to transfer the book prop to another place.

Figure 15 is a perspective view of one of the three identical strips used to connect the principal parts of the entire book prop.

Figure 16 is a vertical side view of the same strip as described in the next preceding paragraph.

Figure 17 is a transverse sectional view taken on the line 17—17 of Figure 1 showing the curved end of the longest side of the base member and showing the relative positions of the connecting strip, the book support and the book rest, while the book prop is in its open or propped position.

Figure 18 is a transverse sectional view taken on the line 18—18 of Figure 3 showing the curved end of the longest side of the base member and showing the relative positions of the connecting strips, the book support and the book rest, while the book prop is in its closed or folded position.

Figure 19 is a transverse sectional view taken on the line 19—19 of Figure 1 showing the curved end of the short side of the base member and showing the relative positions of the connecting strip and the prop while the book prop is in its open or propped position.

Figure 20 is a transverse sectional view taken on the line 20—20 of Figure 3 showing the curved end of the short side of the base member as described above and showing the relative positions of the connecting strip and the prop while the book prop is in its closed or folded position.

Figure 1:
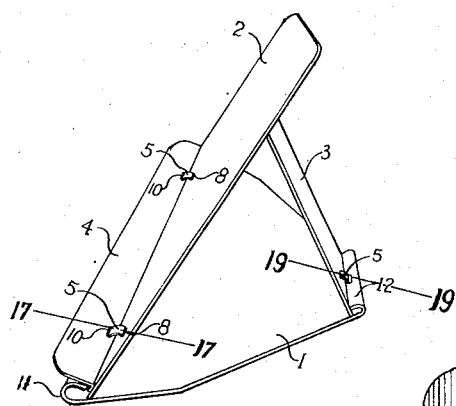
Figure 1 is a perspective view of my book prop in its open or propped position in its entirety showing the principal parts.
Figure 3:
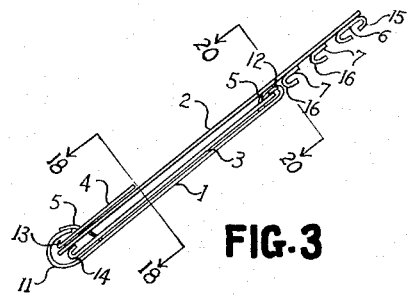
Figure 3 is a vertical side view of the entire book prop in its closed or folded position.
Figure 2:
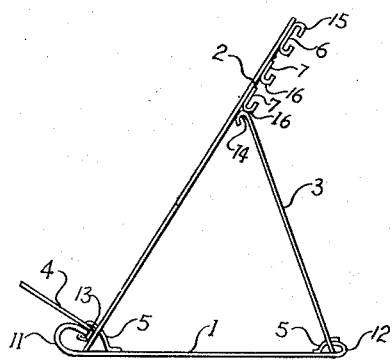
Figure 2 is a side elevation of my book prop in its entirety.
Figure 7:
Figure 7 is a vertical transverse view of the book rest showing the slant-adjustment strips.

My foldable and adjustable book rest and holder support as clearly illustrated in Figures 1 and 2 of the accompanying drawings principally consists in a base member 1, a book rest 2, a prop 3, a book support 4, the connecting strips 5, and the slant-adjustment strips 6 and 7.

The convenience of the student and the reviewee for any government examination is of primary consideration in the present invention. For this reason, I have given the book rest 2 a standard dimension of 7¼ inches in height and 9½ inches in width. The other principal parts have to conform to this dimension of the book rest. Thus, when folded, the book prop assumes the proportions of an ordinary notebook in practically every respect. Actually, the length of the book rest 2 which gives support to the book is only 7 inches, as the remaining ¼ inch at the lower endmost of said book rest 2 goes below the level of the book support 4 while the entire book prop is open.

Figure 6:
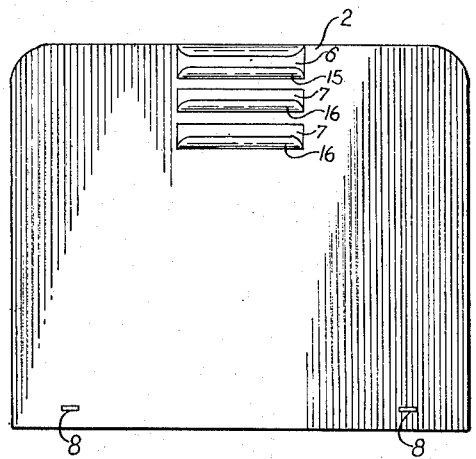
Figure 6 is a rear or under-side view of the book rest showing the permanently attached slant-adjustment strips.

The principal pieces of my invention are joined together by three identical small plastic or tin or any suitable connecting strips 5 (Fig. 15) which efficiently and conveniently serve the purpose of hinges. To join the book support 4 and the book rest 2 to the base member 1, one end of each of two connecting strips 5 is passed through the slots or rectangular holes 8 on the lower edge of the book rest 2 (Fig. 6) and holes 10 on the support 4 (Fig. 8), and then one end is soldered or otherwise permanently attached to the top of the curved end 11 and the other end similarly attached to the plain portion of the base member 1. The same procedure is followed in connecting the prop 3 to the base member 1.

The curved end 11 of the base member 1 has a slant of about 135 degrees from and in relation to the plain portion of said base member 1 such that when the device is in its operative position, the slant of the curved end 11 of the base member 1 maintains a 90-degree-angle position in relation to the propped book rest 2, a position best adapted to the convenience of the reader. This curved end 11 thus serves as the base or foundation of the book support 4 which also maintains a 90-degree-angle position in relation to the propped book rest 2 by means of one of its lengthwise edges 13 which is downwardly hooked and adapted to engage with the lengthwise edge of said curved end 11 of the base member 1.

The longitudinal sides 15 (Fig. 11) of the slant-adjustment strip 6 occupying the uppermost position in the row of four slant-adjustment strips are curved or hooked towards each other such that the upper endmost of the prop 3 is allowed easy access into and out of the enclosure formed by said curved edges 15. Thus, when viewed from the side, the slant-adjustment strip 6 presents a C form. One longitudinal side 16 (Fig. 12) of each of the other slant-adjustment strips 7 is then curved or hooked toward the center by about ¼ of an inch. Thus, when viewed from the side, the slant-adjustment strip 7 presents the lower half portion of a C form. All of said four slant-adjustment strips 6 and 7 are then soldered or otherwise permanently attached horizontally in a row to the center of the upper portion of the under-side of the book rest 2, the one 6 with both longitudinal sides 15 being curved toward the center occupying the topmost position, and the others 7 assuming a similar position immediately below with their hooked ends 16 pointing upward. Thus, when the uppermost tip 14 of the prop 3 is placed right between the confronting edges 15 of the slant-adjustment strip 6, said tip 14 of the prop 3 pushes against the downwardly curved side 15 of said slant-adjustment strip 6, thereby effectively propping the book rest 2, and when the reader takes hold of said book rest 2 so as to lift or transfer the device to another place, the prop 3 slides down and its downwardly hooked tip 14 engages with the upwardly hooked lower portion 15 of the slant-adjustment strip 6, thus preventing the prop 3 from completely falling down. The same function is performed by the lower slant-adjustment strips 7. The outer side of the bottom of the upwardly hooked portions 15 and/or 16 of the slant-adjustment strips 6 and 7 is also capable of containing the push of the prop 3 when the device is in use. Therefore, should the reader desire to change the degree of inclination or slant of the book rest 2, all that he or she has to do is to change the location of the downwardly hooked 14 upper endmost side of the prop 3 from one of the slant-adjustment strips 6 and 7 to another—to a lower location if it is desired to increase the degree of inclination, and to a higher location if it is desired to decrease the degree of inclination.

The length of the book support 4 approximates the width of the book rest 2. One lengthwise edge 13 of the book support 4 (Fig. 8) is hooked or curved. The support 4 is hingedly attached to the base member 1 by means of the connecting strips 5 which are passed through the holes 10 of the support 4 (Fig. 8) in such a manner that said support 4 can be adjusted to a position such that it forms a 90-degree-angle in relation to the propped book rest 2 when the device is in its operative position. The support 4 is always able to maintain a 90-degree-angle position in relation to the book rest 2 by means of the downwardly curved lengthwise edge 13 of said support 4 which interlocks or engages with the lengthwise edge of the curved end 11 of the base member 1 (Fig. 17). Similarly, by reason of the nature of the attachment of the support 4 to the base member 1, said support 4 can also be folded together with the book rest 2 and the base member 1 such that the whole device forms one flat compact mass.

The device can be easily opened or set into an operative position by simply lifting the book rest 2 simultaneously with the prop 3 and placing the hooked upper endmost side 14 of the prop 3 into the slant-adjustment strips 6 or 7 as desired. Likewise, the device can be easily closed or folded from an open or operative position by simply performing the above-described procedure in reverse.

Figure 4:
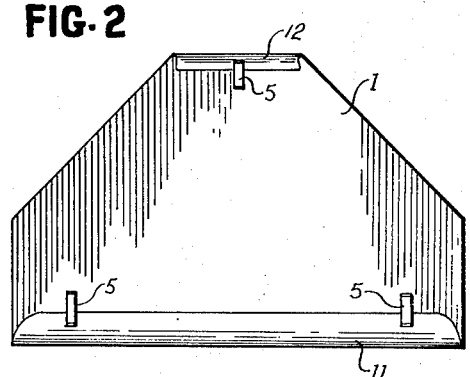
Figure 4 is a perspective view of the base member showing the two curved or hooked opposite sides and the connecting strips which join together the principal parts of the book prop.
Figure 5:
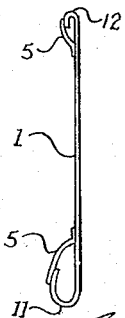
Figure 5 is a vertical transverse view of the base member showing the hooked ends or sides.

The curved sides or ends 11 and 12 of the base member 1 are easily made by inserting said ends while still plain under a rod of about ¼ inch in diameter, which rod is nailed or otherwise attached permanently to the edge of a board in such a way as to permit any material of the thickness of an ordinary tin or galvanized iron to be inserted underneath said rod, and then by folding said base member 1 over said rod. The diameter of the curve of the shorter end 12 of the base member 1 (Fig. 4) is made shorter than its opposite curved end 11 by simply pressing down said curved end 12 after the same has been detached from the rod.

All corners of each part of the entire book prop is rounded so as to eliminate all sharp points or edges.

Having thus described my invention in detail, I now present my claims which I desire to be protected by Letters Patent as follows:

1. In a foldable and adjustable book rest and holder support, a base member with its longest side directly opposite its shortest side being hooked or curved towards the center of said base member such that said curved end has a slant of about 135 degrees from and in relation to the plain body of said base member, a book rest arranged transversely of the base member and in line with the edge of the curved end of the longest side of said base member, said book rest having at its rear or under-face slant-adjustment strips permanently attached horizontally to it in a row, the uppermost of said slant-adjustment strips being bent or fashioned to a C form as viewed from the side and the rest of said strips being curved upwardly as to resemble the lower half portion of a C form for effective engagement with the uppermost tip of the prop piece when the device is in its propped or operative position, means provided in the form of a pair of connecting strips one of the ends of each of which is permanently attached at suitable places on top of the curve of the longest side of the base member and the other end of each of which said connecting strips is similarly permanently attached to the plain portion of said base member after having been passed through suitable holes on said book rest for pivotally connecting the same and adapted to allow said book rest to be adjusted in a freely swinging movement towards and away from the plain portion of the base member when putting the device into an operative position from a closed or folded position, and vice versa, or when changing the slant of said book rest, a book support interposed between the confronting faces of said book rest and the curved end of the base member and similarly connected as the book rest to the base, the lower edge of said book support being downwardly curved such that it engages with the edge of the curved end of the base member when said support is in its operative position such that said book support maintains a 90-degree-angle in relation to the book rest when the device is in its operative position.

2. In a foldable and adjustable book rest and holder support, a base member with its longest side directly opposite its shortest side being hooked or curved towards the center of said base member such that said curved end has a slant of about 135 degrees from and in relation to the plain body of said base member, a book rest arranged transversely of the base member and in line with the edge of the curved end of the longest side of said base member, said book rest having at its rear or under-face slant-adjustment strips permanently attached horizontally to it in a row, the uppermost of said slant-adjustment strips being bent or fashioned to a C form as viewed from the side and the rest of said strips being curved upwardly as to resemble the lower half portion of a C form for effective engagement with the uppermost tip of the prop piece when the device is in its propped or operative position, means provided in the form of a pair of connecting strips one of the ends of each of which is permanently attached at suitable places on top of the curve of the longest side of the base member and the other end of each of which said connecting strips is similarly permanently attached to the plain portion of said base member after having been passed through suitable holes on said book rest for pivotally connecting the same and adapted to allow said book rest to be adjusted in a freely swinging movement towards and away from the plain portion of the base member when putting the device into an operative position from a closed or folded position, and vice versa, or when changing the slant of said book rest, a book support interposed between the confronting faces of said book rest and the curved end of the base member and similarly connected as the book rest to the base, the lower edge of said book support being downwardly curved such that it engages with the edge of the curved end of the base member when said support is in its operative position such that said book support maintains a 90-degree-angle in relation to the book rest when the device is in its operative position, and the shortest side directly opposite the longest side of the base member being similarly curved towards the center of said base member, and a prop pivotally connected to said curved shortest side in the same manner as the book rest and the book support are pivotally connected to the longest side of the base member as described above, the topmost edge of said prop being downwardly hooked as a means for effective propping of the book rest at different degrees of slant and for engaging said hooked tip of the prop piece with the upwardly pointing hooked sides of the slant-adjustment strips attached to the underface of the bookrest, as what happens when the reader takes hold of the book together with the book rest of the device so as to lift or transfer the book together with the device to another place.

References Cited in the file of this patent

UNITED STATES PATENTS

| Number | Name | Date |
|---|---|---|
| 916,901 | Trimble | Mar. 30, 1909 |
| 1,953,527 | Bentley | Apr. 3, 1934 |
| 2,014,176 | Henderson | Sept. 10, 1935 |
| 2,156,404 | Sinclair | May 2, 1939 |
| 2,501,019 | Attick | Mar. 21, 1950 |